United States Patent
Choi et al.

(10) Patent No.: US 12,531,874 B2
(45) Date of Patent: Jan. 20, 2026

(54) GROUP SIGNATURE-BASED FEDERATED LEARNING METHOD AND SYSTEM, AND RECORDING MEDIUM FOR PERFORMING SAME

(71) Applicant: Foundation of Soongsil University-Industry Cooperation, Seoul (KR)

(72) Inventors: Bongjun Choi, Seoul (KR); Sneha Kanchan, Seoul (KR)

(73) Assignee: FOUNDATION OF SOONGSIL UNIVERSITY INDUSTRY COOPERATION, Seoul (KR)

( * ) Notice: Subject to any disclaimer, the term of this patent is extended or adjusted under 35 U.S.C. 154(b) by 47 days.

(21) Appl. No.: 18/835,567

(22) PCT Filed: Dec. 26, 2022

(86) PCT No.: PCT/KR2022/021289
§ 371 (c)(1),
(2) Date: Aug. 2, 2024

(87) PCT Pub. No.: WO2023/149660
PCT Pub. Date: Aug. 10, 2023

(65) Prior Publication Data
US 2025/0141876 A1   May 1, 2025

(30) Foreign Application Priority Data
Feb. 4, 2022   (KR) ........................ 10-2022-0014907

(51) Int. Cl.
*H04L 9/40*   (2022.01)
*G06N 20/00*   (2019.01)

(52) U.S. Cl.
CPC ........... *H04L 63/104* (2013.01); *G06N 20/00* (2019.01); *H04L 63/105* (2013.01)

(58) Field of Classification Search
CPC ...... H04L 63/104; H04L 63/105; G06N 20/00
See application file for complete search history.

(56) References Cited

U.S. PATENT DOCUMENTS

| | | | |
|---|---|---|---|
| 2021/0256309 A1 | 8/2021 | Huth et al. | G06K 9/6257 |
| 2021/0406782 A1 | 12/2021 | Nakayama et al. | G06N 20/20 |

(Continued)

FOREIGN PATENT DOCUMENTS

| | | |
|---|---|---|
| CN | 112597542 A | 4/2021 |
| CN | 112636989 A | 4/2021 |
| KR | 10-2019-0096872 A | 8/2019 |

OTHER PUBLICATIONS

Korean Office Action mailed Jan. 10, 2024, issued in corresponding Korean Patent Application No. 10-2022-0014907.

(Continued)

*Primary Examiner* — Hee K Song
(74) *Attorney, Agent, or Firm* — Stein IP LLC (57) ABSTRACT

According to one embodiment of the present invention, a group signature-based federated learning method by a group signature-based federated learning system including at least one client terminal and an administrator terminal provided as a group, and a server distributing a federated learning model to the at least one client terminal may comprise requesting, by the client terminal, a group signature to the administrator terminal; transmitting, by the administrator terminal, a group signature response to the client terminal in response to the request for the group signature; generating, by the client terminal, update information of signed federated learning using the group signature response and transmitting it to the server to request participation in federated learning update; transmitting, when the server receives the request for participation in the federated learning update, a latest group signature request to the administrator terminal and receiving a latest group signature response from the (Continued)

administrator terminal; and comparing, by the server, the latest group signature response with update information of the signed federated learning to determine whether signatures match, and if the signatures match, updating and redistributing the federated learning model to at least one client terminal.

11 Claims, 6 Drawing Sheets

(56) References Cited

U.S. PATENT DOCUMENTS

2021/0409197 A1* 12/2021 Baracaldo Angel .......................... G06F 18/2148
2022/0311623 A1*  9/2022 Tomlinson ............ H04L 9/3255

OTHER PUBLICATIONS

Gay Athri, Nemani Bhagya et al. Efficient and secure pairing-free certificateless directed signature scheme. Journal of King Saud University—Computer and Information Sciences. Mar. 9, 2018.

Kanchan, Sneha et al. Efficient and Privacy Preserving Group Signature for Federated Learning. arXiv:2207.05297v1. Jul. 2022. [Retrieved on Mar. 14, 2023]. Retrieved from <https://arxiv.org/pdf/2207.05297v1.pdf>.

International Search Report mailed Mar. 22, 2023, issued to the corresponding International Application No. PCT/KR2022/021289.

* cited by examiner

| SYMBOL | MEANING |
| --- | --- |
| GS | GROUP SIGNATURE |
| FL | FEDERATED LEARNING |
| GSFL | GROUP LEARNING-BASED FEDERATED LEARNING |
| ID or $x_i$ | ACTUAL ID OF CLIENT i |
| GID | GROUP ID |
| $A_i$ | SIGNATURE COMPONENT CORRESPONDING TO EACH ID |
| y | SECRET KEY OF ADMINISTRATOR |
| u, v, a, b | INDEX USED IN SIGNATURE |
| h | HASH FUNCTION |
| Upd | UPDATE CLIENT SYSTEM AFTER LOCAL LEARNING |
| LatestGS | LATEST GROUP SIGNATURE |
| $b_u$ | BINDING VALUE FOR CALCULATING SIGNATURE VALUE |
| B1, B2, B3, B4, B5 | BINDING VALUE FOR CALCULATING HASH VALUE |
| s1, s2, s3, s4, s5 | SIGNATURE VALUE FOR CALCULATING FINAL SIGNATURE VALUE |
| C1, C2, C3 | TRACKING VARIABLE FOR TRACKING SIGNER |

GROUP SIGNATURE-BASED FEDERATED LEARNING METHOD AND SYSTEM, AND RECORDING MEDIUM FOR PERFORMING SAME

CROSS-REFERENCE TO RELATED APPLICATIONS

This application is a national stage of International Application No. PCT/KR2022/021289, filed Dec. 26, 2022, which claims the benefit of Korean Application No. 10-2022-0014907, filed Feb. 4, 2022, in the Korean Intellectual Property Office, the disclosures of which are incorporated herein by reference.

TECHNICAL FIELD

The present invention relates to a group signature-based federated learning method and system, and a recording medium for performing the same, and more particularly, it relates to a group signature-based federated learning method and system for reducing computational costs and communication costs occurring in federated learning, and a recording medium for performing the same.

BACKGROUND ART

Federated learning is a machine learning technology that learns a global model in a situation where data is decentralized through collaboration between a plurality of local clients and a central server. Here, the local client can be a terminal used by the user, such as an Internet of Things device or a smartphone.

Federated learning was first announced by McMahan in a paper in 2017, and was officially introduced in the Google AI blog in 2017, and began to receive much attention as a technology applied to the Zero Mobile Google Gboard.

Meanwhile, federated learning is a machine learning that learns a global model locally using the computing resources of the client rather than the client transmitting data to the server, and only transmitting the learning results of the global model to the central server. To solve the single-point failure problem that may occur due to the use of a central server, a decentralized learning structure or a Cross-Device federated learning structure is being proposed.

However, in a decentralized learning structure, in order to maintain confidentiality and protect personal information, each client needs to communicate with a plurality of clients, and as the number of clients increases, computational and communication costs increase exponentially. In addition, since each client exchanges its own encryption key, there is a problem that users can be tracked.

RELATED ART

Korean Patent Application Publication No. 10-2019-0096872

DISCLOSURE

Technical Issues

The present invention has been made to solve the above problems, and an object of the present invention is to provide a group signature-based federated learning method and system capable of performing federated learning based on group signatures, and a recording medium for performing the same.

Technical Solution

In order to achieve the above object, according to one embodiment of the present invention, a group signature-based federated learning method by a group signature-based federated learning system including at least one client terminal and an administrator terminal provided as a group, and a server distributing a federated learning model to the at least one client terminal may comprise requesting, by the client terminal, a group signature to the administrator terminal; transmitting, by the administrator terminal, a group signature response to the client terminal in response to the request for the group signature; generating, by the client terminal, update information of signed federated learning using the group signature response and transmitting it to the server to request participation in federated learning update; transmitting, when the server receives the request for participation in the federated learning update, a latest group signature request to the administrator terminal and receiving a latest group signature response from the administrator terminal; and comparing, by the server, the latest group signature response with update information of the signed federated learning to determine whether signatures match, and if the signatures match, updating and redistributing the federated learning model to at least one client terminal.

Further, the transmitting, by the administrator terminal, the group signature response to the client terminal may comprise generating a signature component of an ID using ID information transmitted from the client terminal; and generating a first tracking variable and a second tracking variable by selecting a plurality of indices.

Further, the group signature response may be generated to comprise the signature component of the ID, the first and second tracking variables, and the plurality of indices.

Further, the generating, by the client terminal, update information of signed federated learning may comprise calculating a third tracking variable and a signature variable from the group signature response transmitted from the administrator terminal, and generating update information of signed federated learning including the calculated third tracking variable and signature variable.

Further, the receiving, by the server, a latest group signature response from the administrator terminal may comprise transmitting, by the administrator terminal, the first and second tracking variables included in the group signature response to the server as the latest group signature response according to the latest group signature request.

Further, the redistributing the updated federated learning model to at least one client terminal by the server may comprise storing, by the server, the latest group signature response received from the administrator terminal; calculating, by the server, a separate signature variable using the latest group signature response; comparing, by the server, the separate signature variable with the signature variable included in the update information of the signed federated learning received from the client terminal to determine whether signatures match; and checking the existence of an additional federated learning round if the server confirms that the signatures match.

Further, determining whether the signatures match may further comprise rejecting, if the server confirms that the signatures do not match, the request for participation in the federated learning update transmitted by the client terminal and transmitting a rejection message according to the rejection to the client terminal.

Further, the redistributing the updated federated learning model to at least one client terminal by the server may comprise updating, if the server confirms that the additional federated learning round does not exist, the federated learning model based on the update information of the signed federated learning transmitted from the client terminal, and redistributing the updated federated learning model to the at least one client terminal.

Further, checking the existence of the additional federated learning round may further comprise transmitting, if the server confirms that the additional federated learning round exists, an additional update request to the client terminal; retransmitting, by the client terminal, the update information of the signed federated learning to the server; and performing, by the server, the additional federated learning round using the latest group signature response stored in the server.

In order to another object of the present invention, a computer-readable recording medium according to one embodiment may have recorded thereon a computer program for performing the group signature-based federated learning method.

In order to another object of the present invention, according to one embodiment, a group signature-based federated learning system comprising at least one client terminal and an administrator terminal provided as a group, and a server distributing a federated learning model to the at least one client terminal, wherein the client terminal requests a group signature to the administrator terminal, wherein the administrator terminal transmits a group signature response to the client terminal in response to the request for the group signature, wherein the client terminal generates update information of signed federated learning using the group signature response and transmits it to the server to request participation in federated learning update, wherein, when the server receives the request for participation in the federated learning update, the server transmits a latest group signature request to the administrator terminal and receives a latest group signature response from the administrator terminal, and wherein the server compares the latest group signature response with update information of the signed federated learning to determine whether signatures match, and if the signatures match, updates and redistributes the federated learning model to at least one client terminal.

Advantageous Effects

According to one aspect of the present invention described above, by providing a group signature-based federated learning method and system and a recording medium for performing the same, it is possible to reduce the computational cost and communication cost that increase as the number of clients increases.

In addition, by providing a group signature-based federated learning method and system and a recording medium for performing the same, it is possible to protect personal information with minimal resources.

BRIEF DESCRIPTION OF DRAWINGS

These and/or other aspects will become apparent and more readily appreciated from the following description of the embodiments, taken in conjunction with the accompanying drawings in which.

DETAILED DESCRIPTION OF EMBODIMENTS

The detailed description of the invention set forth below refers to the accompanying drawings which illustrate specific embodiments in which the invention may be practiced. These embodiments are described in sufficient detail to enable those skilled in the art to practice the invention. It should be understood that the various embodiments of the invention, while different from one another, are not necessarily mutually exclusive. For example, specific shapes, structures, and features described herein may be implemented in other embodiments without departing from the spirit and scope of the invention. It should also be understood that the positions or arrangements of individual components within each disclosed embodiment may be changed without departing from the spirit and scope of the invention. Accordingly, the detailed description set forth below is not intended to be limiting, and the scope of the invention is defined only by the appended claims, along with the full scope of equivalents to which such claims are entitled, if properly so described. Like reference numerals in the drawings designate the same or similar functionality throughout the several aspects.

Furthermore, the features and advantages of the present invention will become more apparent from the detailed description based on the accompanying drawings, and the terms or words used in this disclosure and claims should not be interpreted in their usual or dictionary meanings, but should be interpreted in their meanings and concepts which conform to the technical idea of the present invention, based on the principle that the inventor can appropriately define the concept of the term in order to explain his or her own invention in the best way.

Hereinafter, a preferred embodiment of the present invention will be described in detail with reference to the attached drawings.

Figure 1:
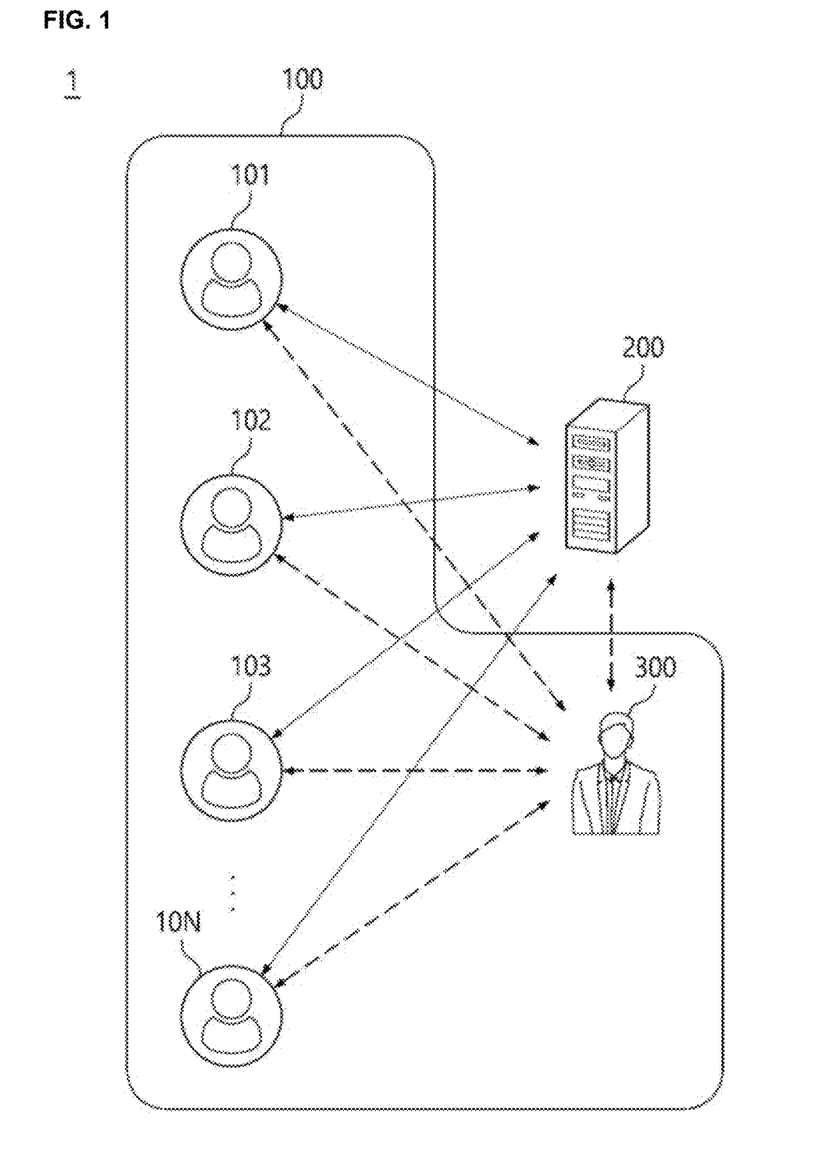
FIG. 1 is a configuration diagram of a group signature-based federated learning system according to one embodiment of the present invention.
Figure 2:
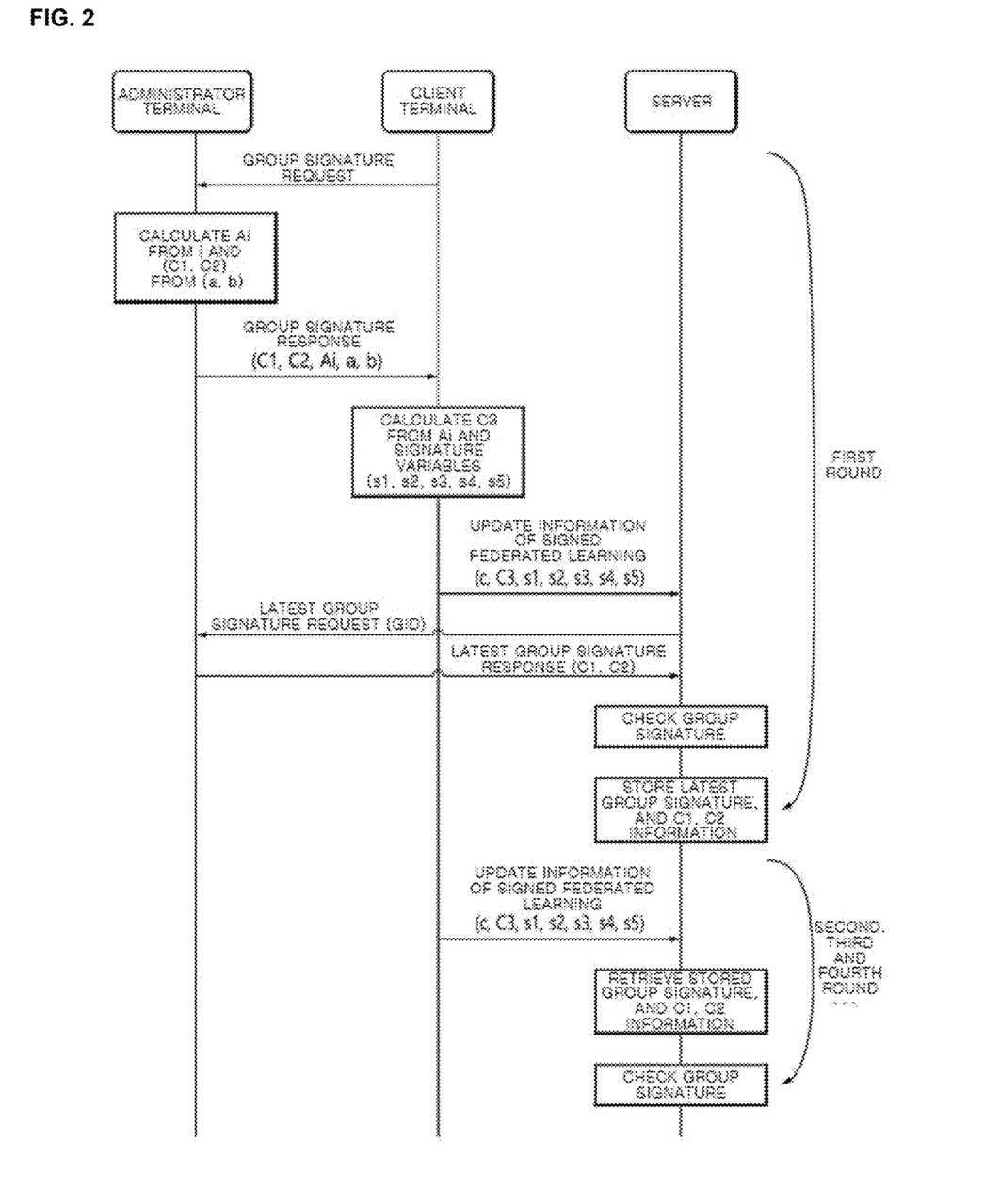
FIG. 2 is a flow chart diagram of a group signature-based federated learning system according to one embodiment of the present invention.

FIG. 1 is a configuration diagram of a group signature-based federated learning system according to one embodiment of the present invention, and FIG. 2 is a flow chart diagram of a group signature-based federated learning system according to one embodiment of the present invention.

As shown in FIG. 1, a group signature-based federated learning system 1 according to one embodiment of the present invention may comprise at least one client terminal 101, 102, 103, . . . 10N and an administrator terminal 300 provided as a group 100, and a server 200 that distributes a federated learning model to at least one client terminal 101, 102, 103, . . . 10N.

Here, at least one client terminal 101, 102, 103, . . . 10N is provided as a device capable of communicating with the administrator terminal 300 and the server 200, such as an IoT (Internet of Things) device or a smartphone, but is not limited thereto.

According to one embodiment of the present invention, the client terminal 101 of the group signature-based federated learning system 1 may request a group signature from the administrator terminal 300, as shown in FIG. 2.

Here, the client terminal 101 may request a group signature from the administrator terminal 300 by transmitting the actual ID information used by the client terminal 101 in the group 100 including the client terminal 101 to the administrator terminal 300 to request a group signature.

Meanwhile, the administrator terminal 300 may generate a group signature response according to the group signature request transmitted by the client terminal 101 and transmit the generated group signature response to the client terminal 101 that transmitted the ID information.

Here, generating a group signature response according to a group signature request is performed by generating a signature component of an ID using the ID information received from the client terminal 101 by the administrator terminal 300, generating a first tracking variable and a second tracking variable through a plurality of indices selected by the administrator terminal 300, and generating the group signature response by comprising the signature component of the generated ID, the first and second tracking variables, and a plurality of indices selected by the administrator terminal 300.

At this time, the signature component of the ID generated by the administrator terminal 300 can be expressed as in [Equation 1], and the first and second tracking variables can be expressed as in [Equation 2].

$$A_i \leftarrow g^{1/(\gamma+x_i)} \in G_1 \qquad \text{[Equation 1]}$$

Here, $A_i$ is a signature component of the ID, $g$ is a generator, $\gamma$ is a secret key of the administrator terminal 300, $x_i$ is the actual ID of the client terminal 101, 102, 103, . . . 10N, and $G_1$ is an isomorphic bilinear group pair.

$$C_1 \leftarrow u^a, C_2 \leftarrow v^b \qquad \text{[Equation 2]}$$

Here, $C_1$ and $C_2$ are the first tracking variable and the second tracking variable, and a, b, u, and v are indices used for signature, which are indices randomly selected by the administrator terminal 300.

Meanwhile, the client terminal 101 may generate update information on signed federated learning using the group signature response received from the administrator terminal 300.

Here, the client terminal 101 may generate updated federated learning information as system update information of the learned client terminals 101, 102, 103, . . . 10N by performing local learning on the federated learning model received from the server 200.

In addition, the client terminal 101 may generate update information of signed federated learning using the group signature response by calculating the third tracking variable and signature variable using the group signature response received from the administrator terminal 300, and including the generated updated federated learning information and the calculated third tracking variable and signature variable.

Here, when the client terminal 101 generates update information on signed federated learning, it may generate and include a separate challenge variable, or omit to generate a separate challenge variable.

At this time, the client terminal 101 generating a third tracking variable using a group signature response can be expressed as in [Equation 3].

$$C_3 \leftarrow A_i h^{a+b} \qquad \text{[Equation 3]}$$

Here, $C_3$ is a third tracking variable, h is a hash function, and a and b are a plurality of indices included in the group signature response.

Meanwhile, the client terminal 101 generating a challenge variable can be expressed as in [Equation 4].

$$c \leftarrow H(\omega, C1, C2, C3, B_1, B_2, B_3, B_4, B_5) \in Z_p \qquad \text{[Equation 4]}$$

Here, C is a challenge variable, C1 and C2 are the first and second tracking variables, C3 is the third tracking variable, and $B_1, B_2, B_3, B_4, B_5$ are binding variables.

Meanwhile, the client terminal 101 generating a signature variable can be expressed as in [Equation 5] and [Equation 6].

Here, [Equation 5] is an equation representing the generation of a signature variable, and [Equation 6] is an equation representing the generation of update information of signed federated learning.

$$s_1 \leftarrow bv_a + ca, s_2 \leftarrow bv_b + cb, s_3 \leftarrow bv_x + cc, s_4 \leftarrow bv_{\delta_1} + c\delta_1, \qquad \text{[Equation 5]}$$
$$s_5 \leftarrow bv_{\delta_2} + c\delta_2$$

Here, $S_1, S_2, S_3, S_4, S_5$ are signature variables, a, b, u, and v are a plurality of indices selected by the administrator terminal 300, c is a challenge variable, $\delta_1, \delta_2$ are intermediate variables used to calculate binding variables, and x is a client terminal ID.

Here, the intermediate variable $\delta_1$ is calculated as the product of the client terminal $ID^x$ and the index a selected by the administrator terminal, and $\delta_2$ is calculated as the product of the client terminal $ID^x$ and the index b selected by the administrator terminal.

$$\sigma GS \leftarrow (C3, c, s_1, s_2, s_3, s_4, s_5) \qquad \text{[Equation 6]}$$

Here, σGS is update information on the signed federated learning, and the client terminal 101 may generate the signed federated learning update information including the third tracking variable, the challenge variable, and the signature variable.

Here, since the client terminal 101 generates only the third tracking variable through the group signature response transmitted by the administrator terminal 300, personal information can be protected with minimal resources.

Meanwhile, the client terminal 101 may request participation in the federated learning update by transmitting the generated signed federated learning update information to the server 200.

At this time, when the server 200 receives the request for participation in the federated learning update from the client terminal 101, it may transmit the latest group signature request to the administrator terminal 300.

In addition, the administrator terminal 300 may transmit the latest group signature response according to the latest group signature request to the client terminal 101.

Here, the latest group signature response may be transmitted to the server 200 including the first and second tracking variables included in the group signature request transmitted from the administrator terminal 300 to the client terminal 101.

Accordingly, the server 200 may compare the latest group signature response transmitted from the administrator terminal 300 with the update information of the signed update federated learning transmitted from the client terminal 101 to determine whether the signatures match.

At this time, the server 200 may calculate a separate signature variable through the first and second tracking variables included in the latest group signature response transmitted from the administrator terminal 300.

Here, the server 200 may calculate the separate signature variable by using the separate index selected by the administrator terminal 300 in the process of generating the first and second tracking variables and different variables included in the update information of the signed update federated learning transmitted from the client terminal 101, as in [Equation 5] described above.

In addition, the server 200 may compare the separate signature variable calculated by the server 200 with the signature variable included in the update information of the signed update federated learning transmitted from the client terminal 101 to determine whether the signatures match.

Accordingly, if the server 200 confirms that the signature of the update of the signed updated federated learning matches, it may check the existence of an additional federated learning round, and if it confirms that the signature does not match, the server 200 may reject the request for participation in the federated learning update transmitted by the client terminal 101 and transmit a rejection message according to the rejection to the client terminal 101.

Meanwhile, the server 200 checks that the signature of the update of the signed updated federated learning matches, and checks whether the additional federated learning round exists based on whether the learning accuracy requirement is satisfied and the limited learning period, and if the server 200 confirms that the additional federated learning round does not exist, it may update the federated learning model based on the update information of the signed federated learning transmitted from the client terminal 101 and redistribute the updated federated learning model to at least one client terminal.

Meanwhile, the server 200 may check the existence of an additional federated learning round, and if an additional federated learning round exists, it may transmit an additional update request to the client terminal 101.

Here, the additional federated learning round checked by the server 200 is a process in which the server 200 receives the signed federated learning update information from the client terminal 101 and checks the signature of the update information of the signed federated learning, as illustrated in FIG. 2.

In addition, the client terminal 101 retransmits the update information of the signed federated learning to the server 200, and the server 200 may further perform an additional federated learning round using the latest group signature response stored in the first round.

Here, since the server 200 checks the signature of the update information of the signed federated learning through the first and second tracking variables included in the latest group signature response stored in the first round, a separate tracking variable is not required, and accordingly, the tracking variable used to track the signature can be prevented from being repeatedly transmitted.

Accordingly, the server 200 may check the signature of the update information of the signed federated learning of all rounds through the first and second tracking variables included in the latest group signature response stored in the first round, update the federated learning, and redistribute the updated federated learning to at least one client terminal 101, 102, 103, . . . 10N.

Meanwhile, a group signature-based federated learning method according to another embodiment of the present invention is performed by a group signature-based federated learning system 1 including at least one client terminal 101, 102, 103, . . . 10N and an administrator terminal 300 provided as a group 100, and a server (200) that distributes a federated learning model to at least one client terminal 101, 102, 103, . . . 10N, and will be described below with reference to FIGS. 3, 4, and 5.

Figure 3:
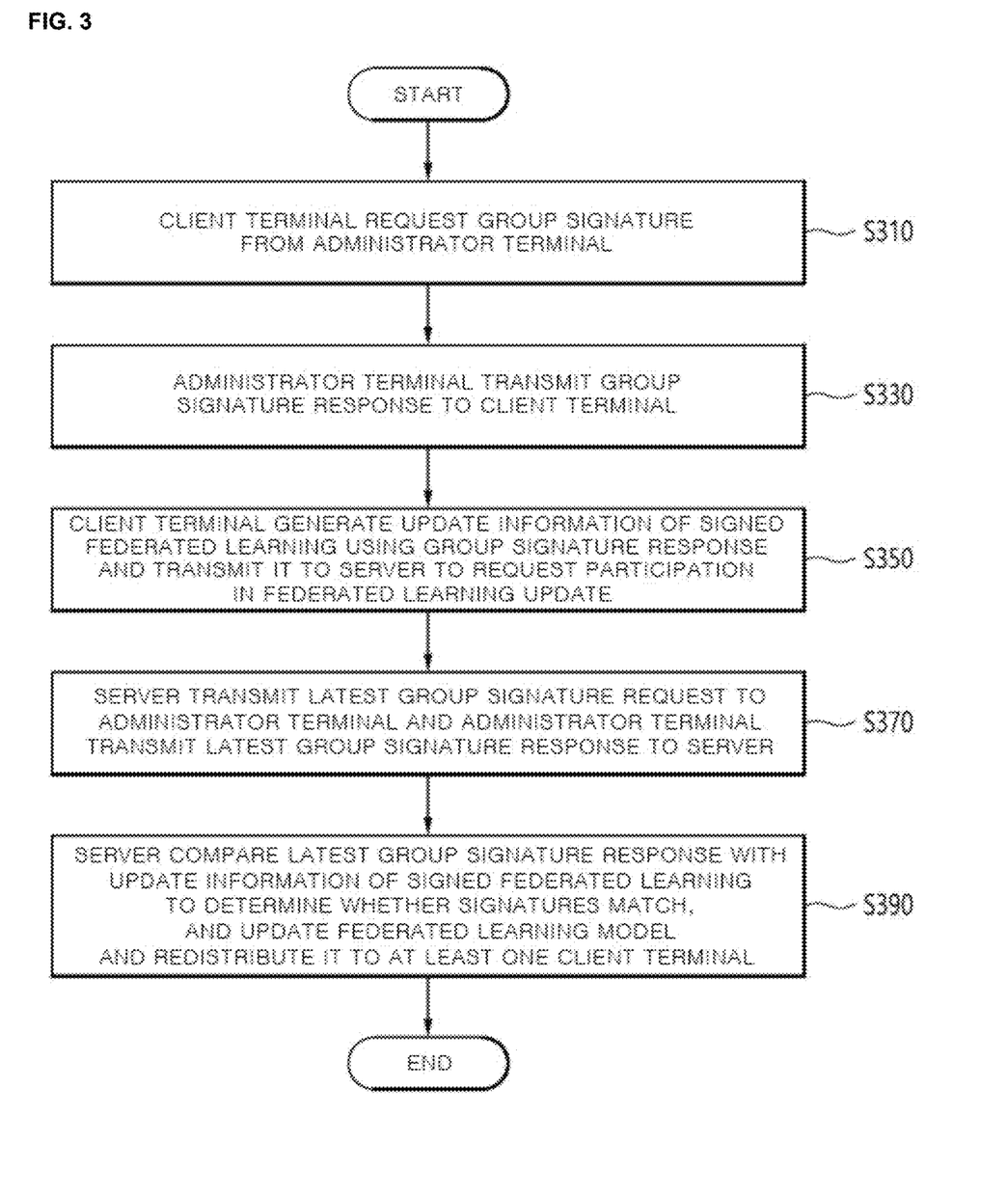
FIG. 3 is a flow diagram for explaining a group signature-based federated learning method according to another embodiment of the present invention.
Figure 4:
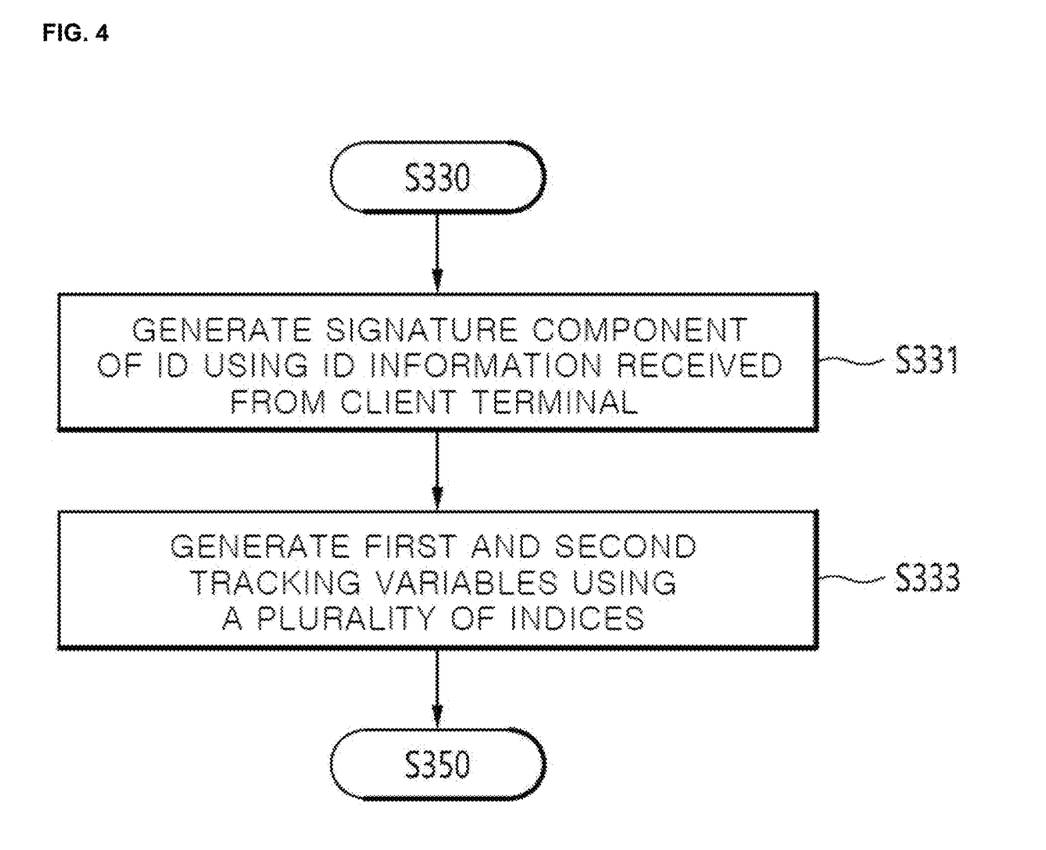
FIG. 4 is a flow diagram for explaining a step of transmitting a group signature response of a group signature-based federated learning method according to another embodiment of the present invention.
Figure 5:
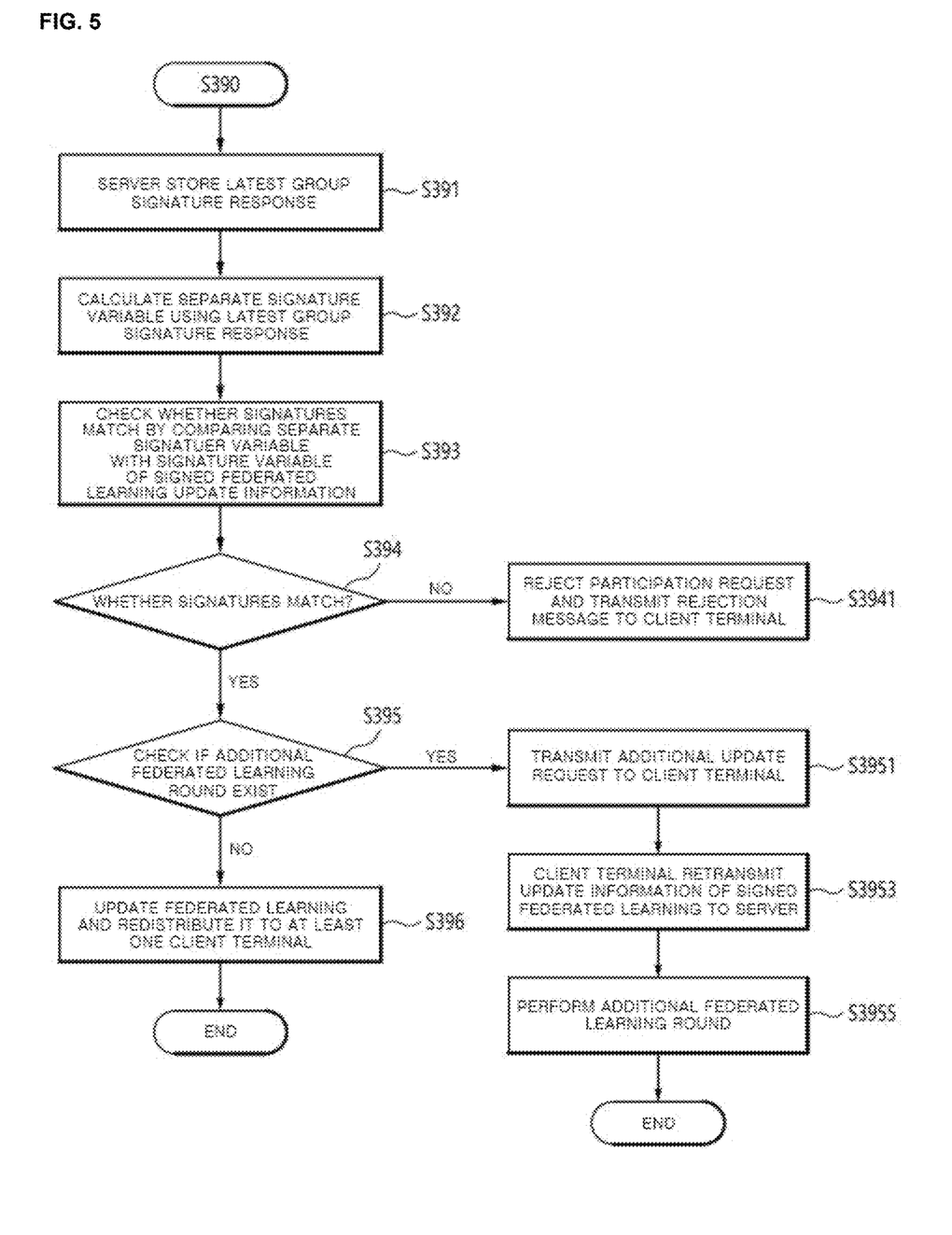
FIG. 5 is a flow diagram for explaining a step of redistributing an updated federated learning model of a group signature-based federated learning method according to another embodiment of the present invention.
Figure 6:
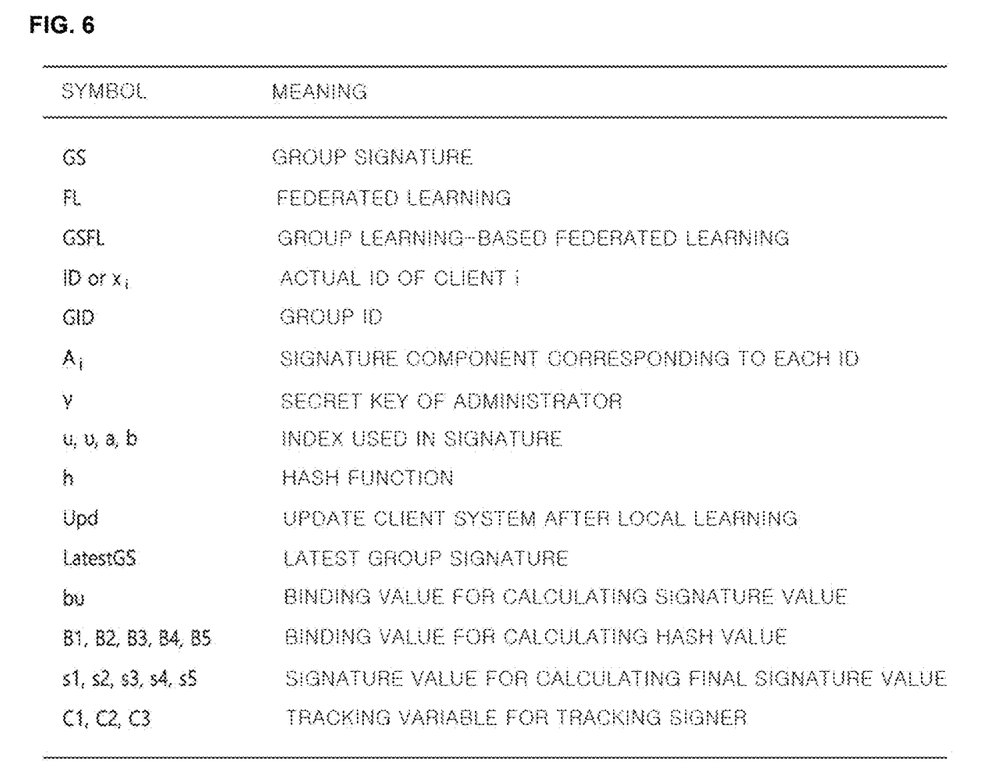
FIG. 6 is a diagram for explaining symbols and meanings used in a group signature-based federated learning method and system according to an embodiment of the present invention, and a recording medium for performing the same.

FIG. 3 is a flowchart for explaining a group signature-based federated learning method according to another embodiment of the present invention, FIG. 4 is a flowchart for explaining a step of transmitting a group signature response of a group signature-based federated learning method according to another embodiment of the present invention, and FIG. 5 is a flowchart for explaining a step of redistributing an updated federated learning model of a group signature-based federated learning method according to another embodiment of the present invention.

The group signature-based federated learning method according to another embodiment of the present invention comprises a step (S310) in which a client terminal 101 requests a group signature from an administrator terminal 300; a step (S330) in which the administrator terminal 300 transmits a group signature response to the client terminal 101 according to the request for a group signature; a step (S350) in which the client terminal 101 generates update information of signed federated learning using the group signature response and transmits it to a server 200 to request participation in federated learning update; a step (S370), in which, when the server 200 receives a request for participation in a federated learning update, it transmits a latest group signature request to the administrator terminal 300 and receives a latest group signature response from the administrator terminal 300; and a step (S390), in which the server 200 compares the latest group signature response with the update information of the signed federated learning to determine whether the signatures match, and if the signatures match, the server 200 updates the federated learning model and redistributes it to at least one client terminal 101, 102, 103, . . . 10N.

In addition, the step (S330) of the administrator terminal 300 of the group signature-based federated learning method according to another embodiment of the present invention transmitting a group signature response to the client terminal

101 in response to a request for a group signature may comprise a step (S331) of generating a signature component of an ID using the ID information transmitted from the client terminal 101; and a step (S333) of generating a first tracking variable and a second tracking variable by selecting a plurality of indices.

In addition, the step (S390) of the server 200 of the group signature-based federated learning method according to another embodiment of the present invention comparing the latest group signature response with the update information of the signed federated learning to determine whether the signatures match, and if the signatures match, updating the federated learning model and redistributing it to at least one client terminal 101, 102, 103, . . . 10N may comprise a step (S391) of the server storing the latest group signature response received from the administrator terminal 300; the step (S392) of the server 200 calculating a separate signature variable using the latest group signature response; steps (S393, S394) of the server 200 comparing the separate signature variable with the signature variable included in the update information of the signed federated learning received from the client terminal 101 to determine whether the signatures match; and the step (S395) of checking the existence of an additional federated learning round when the server 200 confirms that the signatures match.

In addition, the steps (S393, S394), in which the server 200 of the group signature-based federated learning method according to another embodiment of the present invention compares a separate signature variable with a signature variable included in the update information of the signed federated learning received from the client terminal 101 to determine whether the signature matches, may further comprise a step (S3941), in which, if the server 200 determines that the signatures do not match, the server rejects the request for participation in the federated learning update transmitted from the client terminal 101 and transmits a rejection message according to the rejection to the client terminal 101.

Meanwhile, the step (S395), in which, when the server 200 of the group signature-based federated learning method according to another embodiment of the present invention confirms that the signatures match, it checks the existence of an additional federated learning round, may comprise updating the federated learning model based on the update information of the signed federated learning received from the client terminal 101 if the server 200 confirms that additional federated learning round does not exist, and redistributing the updated federated learning model to at least one client terminal 101, 102, 103, . . . 10N (S396).

In addition, the step (S395), in which, when the server 200 of the group signature-based federated learning method according to another embodiment of the present invention confirms that the signatures match, it checks the existence of an additional federated learning round, may further comprise a step (S3951), in which if the server 200 confirms that an additional federated learning round exists, it transmits an additional update request to the client terminal 101; a step (S3953) in which the client terminal 101 retransmits the signed federated learning update information to the server 200; and a step (S3955), in which the server 200 performs an additional federated learning round using the latest group signature response stored in the server 200.

In addition, the group signature-based federated learning method of the present invention may be implemented in the form of program instructions that can be executed through various computer components and recorded on a computer-readable recording medium. The computer-readable recording medium may comprise program instructions, data files, data structures, etc. alone or in combination.

The program instructions recorded on the computer-readable recording medium may be those specifically designed and configured for the present invention, as well as those known to those skilled in the art of computer software and available for use.

Examples of computer-readable recording media include magnetic media such as hard disks, floppy disks, and magnetic tapes, optical recording media such as CD-ROMs and DVDs, magneto-optical media such as floptical disks, and hardware devices specifically configured to store and execute program instructions such as ROMs, RAMs, and flash memories.

Examples of program instructions include not only machine language codes such as those generated by a compiler, but also high-level language codes that can be executed by a computer using an interpreter, etc. The hardware devices may be configured to operate as one or more software modules to perform processing according to the present invention, and vice versa.

Although various embodiments of the present invention have been illustrated and described above, the present invention is not limited to the specific embodiments described above, and various modifications may be made by those skilled in the art without departing from the gist of the present invention claimed in the claims, and such modifications should not be individually understood from the technical idea or prospect of the present invention.

REFERENCE NUMERALS

1: group signature-based federated learning system
100: group provided with at least one client terminal and an administrator terminal
101, 102, 103, . . . , 10N: at least one client terminal
200: server
300: administrator terminal

The invention claimed is:
1. A group signature-based federated learning method by a group signature-based federated learning system including at least one client terminal and an administrator terminal provided as a group, and a server distributing a federated learning model to the at least one client terminal comprising:
  requesting, by the client terminal, a group signature to the administrator terminal;
  transmitting, by the administrator terminal, a group signature response to the client terminal in response to the request for the group signature;
  generating, by the client terminal, update information of signed federated learning using the group signature response and transmitting it to the server to request participation in federated learning update;
  transmitting, when the server receives the request for participation in the federated learning update, a latest group signature request to the administrator terminal and receiving a latest group signature response from the administrator terminal; and
  comparing, by the server, the latest group signature response with update information of the signed federated learning to determine whether signatures match, and if the signatures match, updating and redistributing the federated learning model to at least one client terminal.

2. The method of claim 1, wherein the transmitting, by the administrator terminal, the group signature response to the client terminal comprises,
generating a signature component of an ID using ID information transmitted from the client terminal; and
generating a first tracking variable and a second tracking variable by selecting a plurality of indices.

3. The method of claim 2, wherein the group signature response is generated to comprise,
the signature component of the ID, the first and second tracking variables, and the plurality of indices.

4. The method of claim 3, wherein the generating, by the client terminal, update information of signed federated learning comprises,
calculating a third tracking variable and a signature variable from the group signature response transmitted from the administrator terminal, and generating the update information of the signed federated learning including the calculated third tracking variable and signature variable.

5. The method of claim 3, wherein the receiving, by the server, a latest group signature response from the administrator terminal comprises,
transmitting, by the administrator terminal, the first and second tracking variables included in the group signature response to the server as the latest group signature response according to the latest group signature request.

6. The method of claim 4, wherein the redistributing the updated federated learning model to the at least one client terminal by the server comprises,
storing, by the server, the latest group signature response received from the administrator terminal;
calculating, by the server, a separate signature variable using the latest group signature response;
comparing, by the server, the separate signature variable with a signature variable included in the update information of the signed federated learning received from the client terminal to determine whether signatures match; and
checking existence of an additional federated learning round if the server confirms that the signatures match.

7. The method of claim 6, wherein determining whether the signatures match further comprises:
rejecting, if the server confirms that the signatures do not match, the request for participation in the federated learning update transmitted by the client terminal and transmitting a rejection message according to the rejection to the client terminal.

8. The method of claim 6, wherein the redistributing the updated federated learning model to the at least one client terminal by the server comprises:
updating, if the server confirms that the additional federated learning round does not exist, the federated learning model based on the update information of the signed federated learning transmitted from the client terminal, and redistributing the updated federated learning model to the at least one client terminal.

9. The method of claim 6, wherein the checking the existence of the additional federated learning round further comprises:
transmitting, if the server confirms that the additional federated learning round exists, an additional update request to the client terminal;
retransmitting, by the client terminal, the update information of the signed federated learning to the server; and
performing, by the server, the additional federated learning round using the latest group signature response stored in the server.

10. A non-transitory computer-readable recording medium having recorded thereon a computer program for performing the group signature-based federated learning method according to claim 1.

11. A group signature-based federated learning system comprising at least one client terminal and an administrator terminal provided as a group, and a server distributing a federated learning model to the at least one client terminal,
wherein the client terminal requests a group signature to the administrator terminal,
wherein the administrator terminal transmits a group signature response to the client terminal in response to the request for the group signature,
wherein the client terminal generates update information of signed federated learning using the group signature response and transmits it to the server to request participation in federated learning update,
wherein, when the server receives the request for participation in the federated learning update, the server transmits a latest group signature request to the administrator terminal and receives a latest group signature response from the administrator terminal, and
wherein the server compares the latest group signature response with update information of the signed federated learning to determine whether signatures match, and if the signatures match, updates and redistributes the federated learning model to at least one client terminal.

* * * * *